Nov. 12, 1957    L. H. MARTELL    2,812,864
BALE TURNING APPARATUS
Filed Jan. 2, 1953    2 Sheets-Sheet 1

INVENTOR
Lester H. Martell
BY Robert M. Dennis
ATTORNEY

Nov. 12, 1957     L. H. MARTELL     2,812,864
BALE TURNING APPARATUS

Filed Jan. 2, 1953     2 Sheets-Sheet 2

INVENTOR
Lester H. Martell
BY Robert M. Bunning
ATTORNEY

United States Patent Office 2,812,864
Patented Nov. 12, 1957

2,812,864

BALE TURNING APPARATUS

Lester H. Martell, Somerset, Wis., assignor of fifty percent to Robert M. Dunning, St. Paul, Minn.

Application January 2, 1953, Serial No. 329,389

15 Claims. (Cl. 214—1)

This invention relates to an improvement in bale turning apparatus and deals particularly with a device for turning over a bale of hay or the like.

After hay has been cut and baled, it often must be left on the ground temporarily until it can be picked up and stored. In the event of rainy weather the bale becomes damp and should be dried before it is stored. In many instances the bales are left in the field to be dried by the wind and sun for a period of time and then the bales are turned over so that the drying action will be completed. Turning over the bales of hay is a difficult and time consuming task due to the weight of the bales and the fact that they are lying upon the ground.

The object of the present invention lies in the provision of a simple apparatus which may be attached to a tractor or similar implement and which operates to roll the bales over automatically. The device is preferably mounted to extend laterally of the tractor so that it is only necessary to drive alongside of the bale so that the apparatus engages the bale and rolls it over. With this apparatus hundreds of bales of hay may be turned over in a relatively small space of time.

A feature in the present invention resides in the provision of an apparatus designed to engage into the bale of hay at a point above the center of the bale and to move the apparatus forwardly. The bale rests upon the ground and provides sufficient friction in its contact with the ground to permit the turning device to roll the bale through half a turn.

A feature of the present invention resides in the provision of a bale engaging device which is pivotally supported so that it may raise with the bale as it turns and remain in engagement with one portion of the bale throughout the turning operation. As a result the device may be supported to engage the bale at a point spaced substantially from the upper extremity of the bale and swing over the top of the bale as the bale is turned.

An added feature of the present invention resides in the provision of a bale turning device including a support and a bale engaging device which is rotatably supported to pivot about an axis substantially parallel to the axis of rotation of the bale. Accordingly as the bale is turned the bale engaging device rotates about its axis so as to remain in engagement with a predetermined portion of the bale.

Still another object of the present invention lies in the provision of a tined bale engaging element which is normally supported with the tines extending forwardly and downwardly. As the tines engage into the bale and the tined member is moved toward the bale, the tined element rolls over the bale and the tined element pivots about its axis to remain engaged into the bale until the rolling operation is completed.

These and other objects and novel features of my invention will be more clearly and fully set forth in the following specification and claims.

The bale turning device is indicated in general by the letter A and is shown supported by a suitable vehicle such as a tractor B. Tractors of the type in question are usually provided with a draw bar such as 10 which usually includes a pair of parallel arms 11 and 12 and a transverse cross member 13. The draw bar is normally provided with a series of apertures 14 therethrough designed to accommodate fastening means to permit attachment of various devices.

Figure 6:
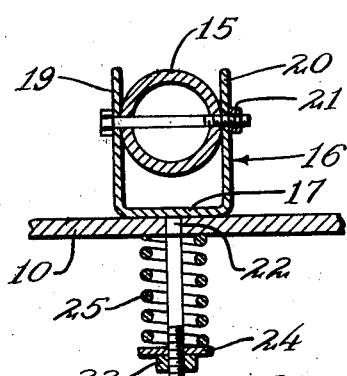
Figure 6 is a sectional view through a detail portion of the apparatus.

An elongated arm 15 is pivotally supported to the draw bar 10 near the rearwardly extending arm 11 thereof. As indicated in Figure 6 of the drawings a U-shaped yoke 16 is provided with a base 17 and parallel upwardly extending arms 19 and 20 between which an end of the arm 15 extends. A pivot bolt 21 extends through the arm 15 and through the sides 19 and 20 of the yoke to pivotally connect these two elements.

A shank 22 projects downwardly from the center of the yoke 16 and is threaded at its lower extremity to accommodate an adjusting nut 23. A washer 24 is provided adjacent the nut 23 and a spring 25 is interposed between the washer 24 and the undersurface of the draw bar 10. As a result the yoke 16 may pivot about a vertical axis and may also move vertically when sufficient stress is placed upon the yoke.

A collar 26 encircles the arm 15 at a point spaced from its pivot and is held from longitudinal movement on the arm by some means such as the pin 27. An arm 29 is connected to the collar 26 and is pivotally connected at 30 to a spoke 31 arranged on a vertical pivot extending through the draw bar 10 near the arm 12 thereof. The arm 29 acts as a link to hold the arm 15 in proper angular relation to the tractor and still permits the vertical pivotal movement of the arm 15 which is essential to the operation of the apparatus. A collar 32 is supported upon the arm 15. This collar 32 is held from rotation with respect to the arm 15 by a set screw or pin 33. A segment 34 is secured to the collar 32 to extend angularly with respect thereto and to project above the collar. A lever 35 is pivotally connected to the segment 34 at 36.

Figure 1:
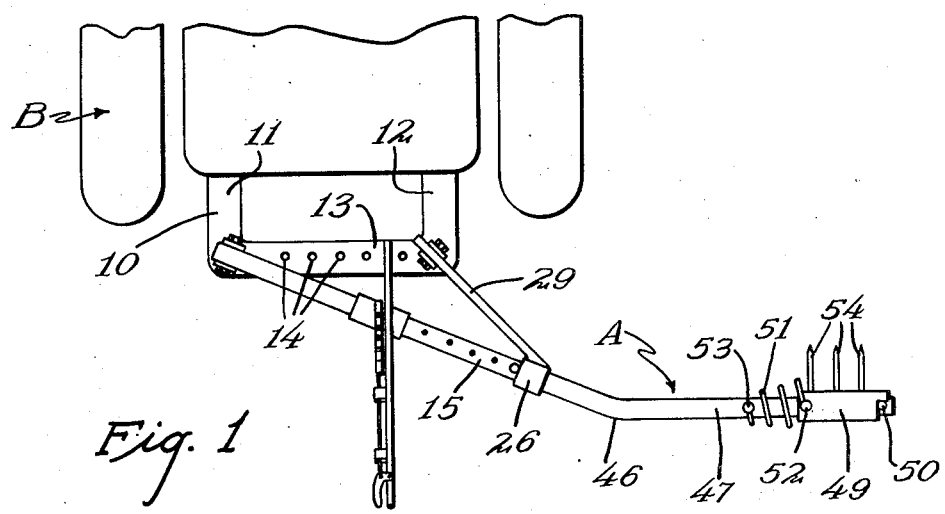
Figure 1 is a top plan view of the apparatus in readiness for operation.
Figure 3:
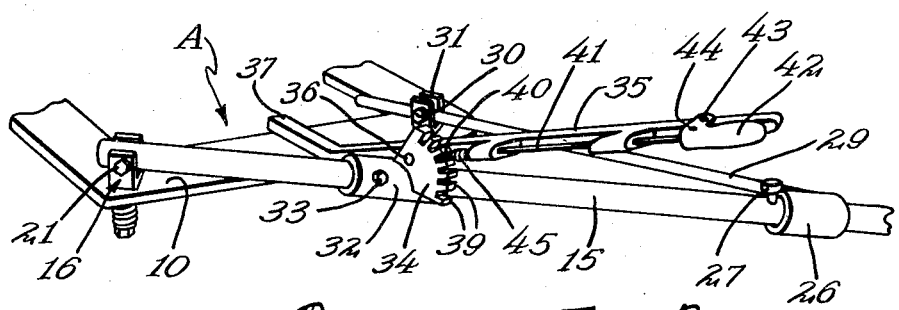
Figure 3 is a perspective view of a portion of the apparatus.
Figure 4:
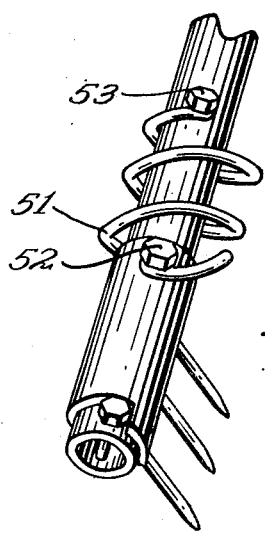
Figure 4 is a perspective view of the bale engaging device forming a part of the apparatus.

As indicated in Figures 1 and 3 of the drawings, the lever 35 is provided with an angularly turned end 37 which bears upon the upper surface of the draw bar 10. The segment 34 is provided in its periphery with spaced teeth 39. The lever 35 is provided with a slidably supported dog 40 engageable selectively with any of the teeth 39. A rod 41 is connected to the dog 40 and a handle lever 42 is pivotally connected at 43 to the lever 35 and is pivotally connected at 44 to the rod 41. The dog 40 is urged into engagement with one of the teeth by a spring 45.

By pivoting the lever 35 about its pivot 36 the arm 15 may be raised or lowered relative to the ground. In other words, the outer end of the arm 15 may be adjusted in its relation to the ground by releasing the dog 40 and pivoting the lever 35 in one direction or another. The arm pivots about the pivot bolt 21 in the yoke 16.

As indicated in Figure 1 of the drawings the arm 15 is preferably bent at 46 so that the outer extremity 47 of this arm extends at substantially right angles to the direction of movement of the tractor B. A sleeve 49 is rotatably supported upon the end of the arm 15 and is held from axial movement by a pin 50 in the arm 15. A torsion spring 51 is connected at one end as indicated at 52 to the sleeve 49 and is connected at its other end 53 to the arm 15. The torsion spring is of proper length and is properly positioned so that the parallel tines 54 projecting radially from the sleeve 49 extend forwardly and downwardly.

Figure 2:
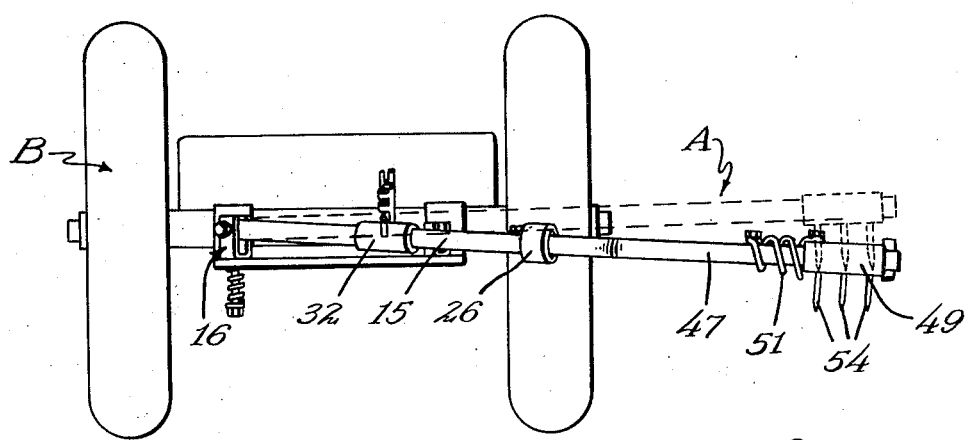
Figure 2 is a rear elevational view showing the apparatus in readiness for use.
Figure 5:
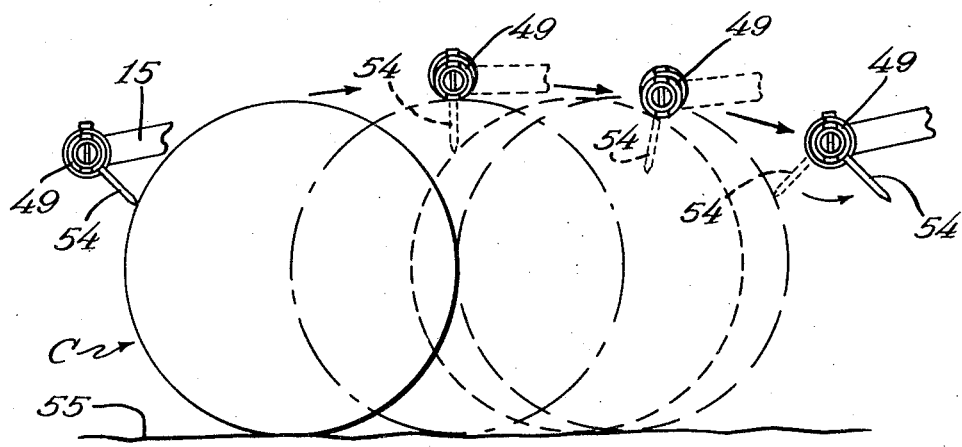
Figure 5 is a diagrammatic view showing the manner in which the device engages the bale and rolls it over.

The operation of the apparatus can best be determined from an observation of Figure 5 of the drawings. The bale turning apparatus A is mounted upon the tractor B to extend laterally thereof as indicated in Figures 1 and 2. Figure 5 illustrates successive positions of the end of the arm 15 and shows at the left side of the figure the sleeve 49 and the tines 54 extending forwardly and downwardly to the rear therefrom. A bale C is illustrated as resting upon the surface of the ground 55. The bale C is of a cylindrical type. However, the apparatus will also function on bales of rectangular form. The tines 54 at the left side of Figure 5 are shown about to enter the bale C. Movement of the tines to the right cause these tines to enter into the bale. Further forward movement of the arm 15 and sleeve 49 supported thereupon starts to rotate the bale or roll the same along the surface of the ground. When the sleeve 49 comes into contact with the surface of the bale, this contact is normally below the top of the bale and accordingly as the sleeve moves forwardly the arm 15 must raise upwardly to pass over the upper extremity of the bale.

During this operation the lever 35 lifts up from the surface of the draw bar, the arm pivoting about the pivot 16. The arm is held at approximately the same angle to the tractor by the link 29. At the center of Figure 5 the sleeve 49 is shown with the tines 54 being directed downwardly. As the bale rolls the tines remain embedded in the hay and the sleeve 49 pivots about its axis on the arm in order to compensate for the different angularity of the tines.

As the bale continues to roll to the third position shown in Figure 5, the tines 54 are directed slightly rearwardly and the sleeve 49 has past the upper extremity of the bale and moves downwardly by gravity. This downwardly movement of the arm continues until the lever 35 bears against the upper surface of the draw bar 13 and holds the outer extremity of the arm from further downward movement.

The bale continues to roll until the arm 15 is entirely in front of the bale and the tines are inclined rearwardly as indicated at the right hand side of Figure 5 and shown in dotted outline. In full lines at the right of Figure 5 are shown the tines 54 after they have been returned to their normal forwardly inclined position by the spring 51. This return rotation takes place as soon as the tines have become disengaged from the bale.

When the bale is cylindrical in form it continues to roll under normal conditions for a short distance after the tines have become disengaged. Therefore, the bale may be easily rolled over through a complete half revolution. When the tractor travels at a relatively high rate of speed, the arm 15 may be raised so that the tines remain in engagement with the bale a shorter length of time. The reason for this action is that when the tractor travels at a higher rate of speed, the bale will roll by momentum a greater distance after the tines have been disengaged. When the tractor travels slow, the arm may be lowered so as to engage the bale at an earlier point, so that the tines will remain engaged in the bale throughout virtually half a revolution of the bale. If the laterally extending end of the arm 15 is just above the vertical center of the bale, the tines will remain engaged through virtually an entire half revolution.

In accordance with the patent statutes, I have described the principles of construction and operation of my bale turning device, and while I have endeavored to set forth the best embodiment thereof, I desire to have it understood that obvious changes may be made within the scope of the following claims without departing from the spirit of my invention.

I claim:

1. A bale turning apparatus for use with a movable means, the apparatus including a member designed to engage the bale along a line substantially parallel to the longitudinal axes of the bale, and above the vertical center of the bale, means supporting said member for movement over the bale as the bale rolls about its axis, and means connecting said bale engaging means to said movable means for movement in conjunction therewith.

2. A bale turning apparatus including a bale engaging member engageable with a bale generally parallel to the longitudinal axis of the bale and above the vertical center thereof, and means supporting said bale engaging means for vertical movement to pass over the bale as the bale rolls about its axis.

3. A bale turning device for use with a tractor including an arm extending laterally with respect to the direction of movement of the tractor, means normally supporting said arm at an elevation greater than the radius of the bale and less than the diameter of the bale, said arm being engageable with a bale along a line substantially parallel to the longitudinal axis of the bale to roll the bale about this axis, and means in said supporting means for permitting upward movement of the free end of said arm to pass over the bale as it rolls.

4. The structure described in claim 3 and including bale penetrating means supported upon said arm.

5. The structure described in claim 3 and including bale penetrating means pivotally supported upon said arm for pivotal movement about the axis of the arm.

6. A bale turning device for use with a tractor including an arm, means supporting said arm to extend laterally of the tractor with respect to the direction of movement thereof, said supporting means supporting the free end of said arm at an elevation above the vertical center of the bale and below the level of the top of the bale while said arm is resting with its longitudinal axis substantially horizontal, said arm being engageable against the bale along the line parallel to the longitudinal axis of the bale, and means pivotally supporting said arm for upward movement so that the arm may pass over the bale as the bale rolls about said axis.

7. The structure described in claim 6 and including bale penetrating means on said arm near the free end thereof.

8. The structure described in claim 6 and including bale penetrating means secured on said arm near the free end thereof for rotation about the axis of the arm.

9. The structure described in claim 6 and including bale penetrating means pivotally supported on said arm near the free end thereof for rotation about the axis of the arm, and means normally biasing said bale penetrating means toward one rotative position thereof.

10. A bale turning device for use with a tractor including an arm extending rearwardly and laterally from the tractor, means connecting the tractor and said arm at a point spaced from the first connection to hold the arm in proper relation to the tractor, means cooperable between said tractor and said arm for holding the free end of the arm at an elevation greater than the vertical center of the bale, and means swingably supported on said arm supported below the top of the bale and engageable with said bale, said arm passing over a bale engaged with said swingably supported means upon movement of said tractor.

11. The structure described in claim 10 and including a pivotal connection between said arm and the tractor.

12. The structure described in claim 10 and in which said swingably supported means includes bale penetrating means supported on said arm near the free end thereof, and means pivotally supporting said bale penetrating means for pivotal movement about the axis of the arm.

13. The structure described in claim 10 and including resilient means for biasing said swingably supported means toward one angular position.

14. A tractor actuated agricultural implement for turning over bales of hay or the like comprising supporting structure secured to the tractor, an arm yieldably secured to said supporting structure laterally of the tractor, and a bale engaging finger secured to said arm for engaging a bale to turn it over as the tractor is driven past the bale.

15. A bale turning device for use with a tractor including an arm, means supporting said arm to extend laterally of the tractor with respect to the direction of movement thereof, and bale engaging means on the free end of said arm swingably supported about the axis of the arm, said bale engaging means being supported for engagement with the bale above the longitudinal axis of the bale and below the top thereof when said bale is resting with its longitudinal axis generally parallel to the ground, said bale engaging means swinging about the axis of the arm upon movement of the tractor after said bale engaging means engages the bale, said arm supporting means supporting said arm for movement over the bale as said bale engaging means swings about the arm axis.

References Cited in the file of this patent

UNITED STATES PATENTS

| | | |
|---|---|---|
| 1,520,699 | Curriden | Dec. 30, 1924 |
| 1,774,656 | Miller | Sept. 2, 1930 |
| 2,634,003 | Williamson | Apr. 7, 1953 |